June 22, 1943.   P. R. NICHOLS   2,322,383
STOCK LINE RECORDING MEANS
Filed Sept. 28, 1940   2 Sheets-Sheet 1

INVENTOR.
Paul R. Nichols
By Wilkinson, Huxley, Byron & Knight
ATTORNEYS.

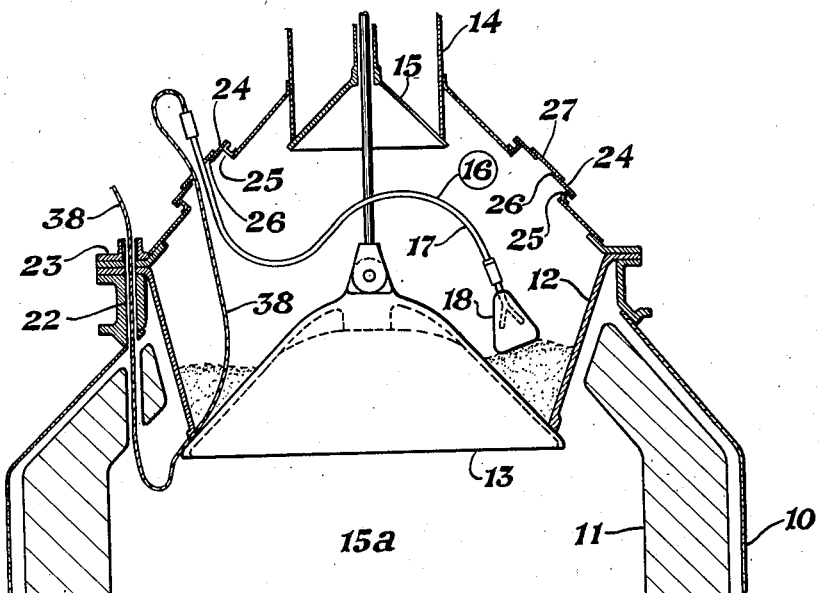

Patented June 22, 1943

2,322,383

UNITED STATES PATENT OFFICE 2,322,383

STOCK LINE RECORDING MEANS

Paul R. Nichols, Chicago, Ill.

Application September 28, 1940, Serial No. 358,823

3 Claims. (Cl. 33—126.5)

The present invention relates to improvements in stock line recording means.

In the operation of a blast furnace it is necessary to know the height of the stock column or burden. This is commonly determined by means of a test rod the bottom of which rests upon the burden. According to certain prior practice the rod has been lowered to the burden when an indication is to be read, the depth to which the rod has been lowered being noted. In more advanced practice the test rod rests upon the burden at all times except when material is being added to the top of the burden, during which period the rod is retracted by hoisting it temporarily to the upper region of the furnace. According to the advanced practice referred to, the test rod is suspended from a cable which passes over sheaves to a winch, which is provided with means to indicate the position of the test rod.

The use of test rods as heretofore known has always been attended by certain short-comings and troubles, which will be briefly discussed.

If a solid rod of small diameter be used (say one inch diameter) the rod is subject to bending when it is lowered through its tube and extended far down into the furnace. Such bending can be caused by the rod settling upon the irregular burden, or may be caused by "rolling" of the burden, that is—sidewise movement. It can also be caused if and when the test rod is left extended into the furnace inadvertently when materials are dumped from the large bell. If and when a test rod is bent in this manner it becomes necessary to drop it into the furnace and to insert a new rod through the opening in the top of the furnace.

It is possible, of course, to use a test rod of greater diameter and consequently greater stiffness. This minimizes the difficulty of bending, but introduces another disadvantage. As previously stated, the test rod is lowered through an opening in the top of the furnace. Often an opening of generally tubular character is used. This opening connects the body of the furnace with the atmosphere. The space within the furnace is under pressure and therefore gas leakage occurs. For practical reasons a considerable clearance has been provided between the test rod and the furnace, and since there are usually three or more test rods per furnace the gas leakage has been an appreciable item. This leakage is objectionable, partly because the gas has a fuel value. It is even more objectionable because of the high CO content of the gas and its poisonous character which provides a hazard for workmen who may be on top of the furnace.

A test rod having a small bottom is further objectionable in view of the fact that the burden is more or less lumpy, so that the rod must rest either on top of the lump or in a space between lumps, its action thus being indefinite. Moreover, such a rod may settle a considerable distance into the interstices of the burden as the burden settles. This impairs the accuracy of the indication. To avoid this it is desirable that the bottom of the rod have a substantial area. However, if a flange or foot is attached to the bottom end of the rod it cannot be inserted through the opening in the top of the furnace, it being possible to attach such a flange or foot only before the furnace is blown in and not by way of replacement when the furnace is in operation. Furthermore, if the flange or foot is attached to the end of the rod and materials pile up on top of such a flange or foot (as for example by a failure to hoist the rod when the large bell is dumped or through settlement or rolling of the burden), the test rod may become burned in the burden.

It has been attempted to use a chain, to the end of which a sash weight or equivalent is attached. This is not satisfactory because when the sash weight strikes the burden the backlash represented by the play in the links of the chain causes inaccuracies in indication. Moreover, the sash weight may tilt and continue to pull down on the chain after one end of the sash weight rests on the burden. The chain is further objectionable because of gas leakage through the opening around the chain. The chain has one advantage, to wit—flexibility in the sense that it cannot become permanently bent.

An object of the present invention is to provide stock line recorder means of simple construction which avoids the above-mentioned disadvantages.

A further object is to provide stock line recording means which will be accurate and which may bend under conditions of stress without damage.

A further object is to provide an improved test rod which may be replaced while the furnace is in operation.

A further object is to provide an improved method for inserting a test rod into a furnace when said furnace is in operation.

Further objects will appear as the description proceeds.

Referring to the drawings—

Figure 3 is a view illustrating how the test rod may be inserted into the furnace; and Figures 4 and 5 illustrate a semi-rigid cable which may be used as part of the test rod in the practice of the present invention.

Figure 1:
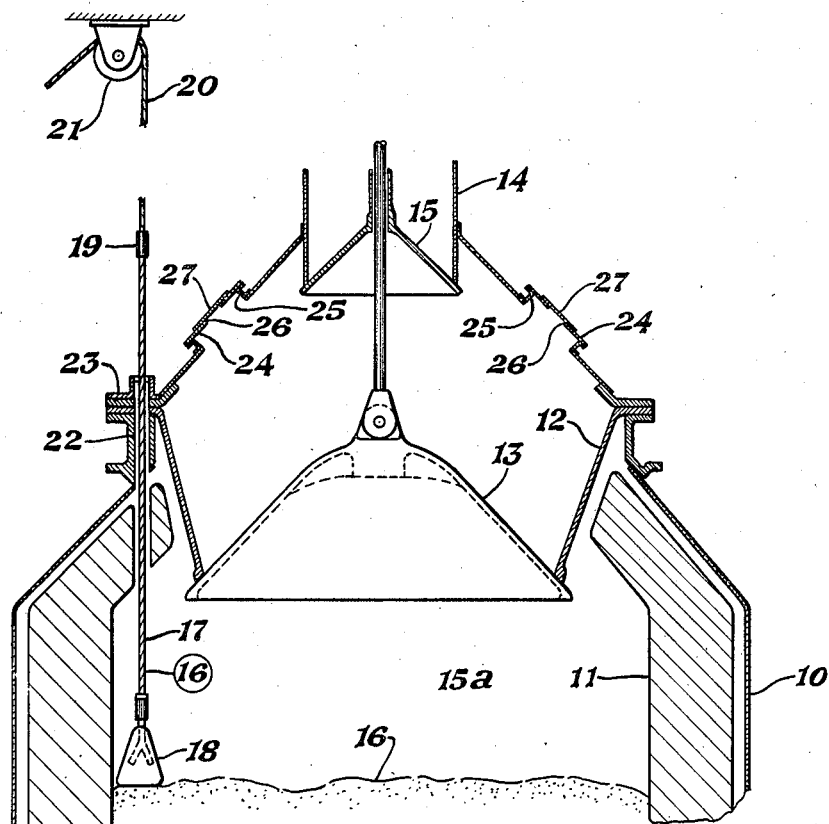
Figure 1 is a sectional view, more or less diagrammatic in its nature, illustrating a physical embodiment of the present invention.

The numeral 10 indicates a furnace shell having the lining 11. At the top of the shell 10 is the large bell hopper 12 provided with the large bell 13. Above the large bell hopper 12 is the small bell hopper 14 provided with the small bell 15. The furnace region is indicated by the numeral 15a.

The numeral 16 indicates a test rod including the semi-rigid cable 17 and the weight member 18, which weight member forms a broad base foot. At the upper end of the cable 17 is the cable attachment fitting 19, which serves to secure to the cable 17 the cable 20, which is trained over the sheave 21 and may be connected to a winch (not shown). The numeral 22 indicates a tubular passageway to permit reciprocation of the cable 17. Said passageway 22 should preferably have liberal clearance with respect to said cable 17. The numeral 23 indicates a gland fitting for providing a relatively close fit for the cable 17 to minimize escape of gas along said cable. The details of the gland fitting 23 are illustrated in Figure 2 and will be described more in detail presently.

The numerals 24—24 indicate manhole covers covering the openings 25—25. Each of said covers 24 is provided with an opening therein, indicated by the numeral 26. Said openings 26 are closed by the covers 27.

Figure 2:
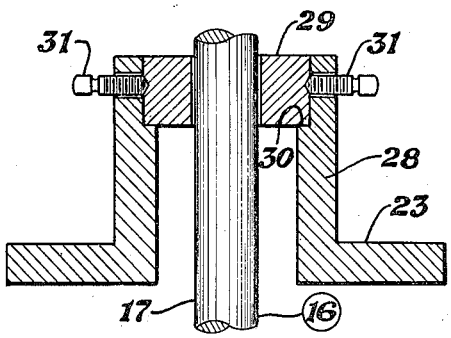
Figure 2 illustrates a detail of construction.

Referring now to Figure 2, the gland fitting 23 provides a tube 28 for permitting reciprocation of the cable 17. The tube 28 is of generous size compared to the diameter of the cable 17, and a split collar 29 is provided for closely receiving said cable 17. Said split collar 29 may rest upon a shoulder 30 and may be held in place by means of the setscrews 31—31.

According to the present invention the cable 17 should have sufficient flexibility to bend without damage in the event that it is subjected to sidewise stresses caused, for example, as the action of settling within the interstices of an irregular burden, or by rolling of the burden. Materials suitable for the cable 17 are available in the market and are known under various names, such for example as locked coil track cable, or locked wire cable. One type which is suitable for practice of the present invention is illustrated in Figures 4 and 5, and has a metallic core 32 covered by alternate spiral layers 33, 34, 35, 36 and 37 extending in opposite directions and presenting a substantially smooth cylindrical exterior surface. A cable suitable as a test rod according to the present invention has the following characteristics and advantages:

1. Adequate tensile strength at the temperatures encountered above the burden in a blast furnace.

2. Absence of any decided tendency to untwist and lengthen under the influences of heat and tension.

3. Adequate rigidity to act much like a rod in converting a tensile pull into a compressive push when the weight rests on the burden if an attempt were made lightly to push the rod further down. It introduces no backlash and is stiff enough under the conditions of use to act as a substantially rigid column, avoiding limpness due to its own weight which might lead to an incorrect indication.

4. Sufficient flexibility to permit bending when the burden rolls or if exposed to discharge of burden from the large bell while avoiding any permanent set. If temporarily bent, it straightens when subject to tension.

5. A smooth cylindrical exterior of relatively small diameter which can be closely fitted to an enclosure member to minimize gas leakage.

6. Sufficient flexibility to permit placement into position when the furnace is in operation, by procedure which will be described presently.

Under conditions as now encountered it will be preferred to use a test rod having a diameter in the neighborhood of ¾ to 1 inch. Such a diameter would be excessive for the intermediate run of cable 20 between the cable 17 and the winch (not shown). For this stretch of cable a diameter of ¼ to ⅜ inch is ample. Such cable is relatively cheap and is well adapted to pass over deflecting sheaves of small diameter and around a winch drum, also preferably of small diameter.

A decided advantage of the construction hereinabove described is that it may be installed while the furnace is in operation without the necessity of checking the blast.

A procedure of installing a new test rod according to the present invention is illustrated in Figure 3 and is as follows: A steel pilot cable 38 of relatively small diameter is provided with a sash weight (not illustrated) at one of its ends. The sash weight with the pilot cable is threaded down through the opening 22 in which the cable 17 is eventually to be mounted. With the large bell 13 empty and slightly open, a wire hook is threaded through one of the openings 26. This hook is manipulated to catch the above-mentioned pilot cable 38, which pilot cable is drawn up through the opening 26. The large bell 13 is then closed up against the pilot cable and material may be dumped upon it to form a seal. The manhole cover 24 is then removed. The weight member 18 with the semi-rigid cable 17 attached thereto is lowered through the opening 25 onto the large bell 13 at a point somewhat removed from its ultimate position. The manhole cover 24 is then replaced. The free end of the pilot cable extends out through the opening 26 in said manhole cover. The free end of the semi-rigid cable 17 also extends out through this same opening. These two free ends are connected together by a thimble means of small diameter. The large bell 13 is then opened and the weight member 18 is lowered onto the burden. The pilot cable is pulled upwardly from above the opening 22, thereby pulling the upper end of the semi-rigid cable 17 into its operating position within the opening 22. The cover 27 is then placed upon the opening 26. The upper end of the semi-rigid cable 17 is detached from the pilot cable and attached to the permanent hoisting cable 20. The split collar 29 is then mounted in position. After the cable 17 has been elevated a short distance and lowered to permit the weight member 18 to rest upon the burden, the device is ready for operation.

Though a preferred embodiment of the present invention and a preferred statement of the method of procedure have been described in detail, many modifications will occur to those skilled in the art. It is intended to cover all such modifications that fall within the scope of the appended claims.

What is claimed is:

1. Means for determining the level of the burden in a blast furnace including a test rod, said test rod including a weight member at its bottom and a test rod cable connected to said weight member, means for hoisting said test rod or lowering it onto the burden, said test rod cable being flexible but sufficiently rigid to support its own weight as a column, said weight member and said caable being connected together to act as a column when not in hoisted condition.

2. Means for determining the level of the burden in a blast furnace including a test rod having a weight member attached to the bottom thereof, said test rod having a degree of flexibility such as to enable it to be bent without acquiring a permanent set, the weight member being adequate to straighten said test rod after such bending when said test rod is lifted free of said burden, said test rod having sufficient stiffness and being connected to said weight member to act as a column when not in hoisted condition, a second cable of lesser diameter and greater flexibility, and means for attaching said test rod to said cable, said second cable comprising means for hoisting said test rod.

3. Means for determining the level of the burden in a blast furnace including a test rod, said test rod including a weight member and a cable connected to said weight member, said weight member and said cable being connected together to act as a column when not in hoisted condition, and means for hoisting said test rod or lowering it onto said burden, said determining means including a second cable of lesser diameter and greater flexibility connected to said first-mentioned cable, said test rod cable being flexible but sufficiently rigid to support its own weight as a column, said first-mentioned cable being of cylindrical rod-like configuration.

PAUL R. NICHOLS.

CERTIFICATE OF CORRECTION.

Patent No. 2,322,383.　　　　　　　　　　　　　June 22, 1943.

PAUL R. NICHOLS.

It is hereby certified that error appears in the printed specification of the above numbered patent requiring correction as follows: Page 1, second column, line 25, for "burned" read --buried--; page 3, first column, line 12, claim 1, for "caable" read --cable--; and that the said Letters Patent should be read with this correction therein that the same may conform to the record of the case in the Patent Office.

Signed and sealed this 10th day of August, A. D. 1943.

Henry Van Arsdale,
Acting Commissioner of Patents.

(Seal)